United States Patent [19]

Whitmer

[11] Patent Number: 5,358,068
[45] Date of Patent: Oct. 25, 1994

[54] SAFETY SYSTEM INCLUDING CABLE TENSIONER AND SHOCK ABSORBER

[76] Inventor: Gerald T. Whitmer, Rte. 1, Box 33, Shenandoah Junction, W. Va. 25442

[21] Appl. No.: 969,006

[22] Filed: Oct. 30, 1992

[51] Int. Cl.⁵ ............................................. B21F 27/00
[52] U.S. Cl. ................................ 182/113; 248/613; 182/3
[58] Field of Search ................. 182/3, 113, 4; 248/613

[56] References Cited

U.S. PATENT DOCUMENTS

| | | | |
|---|---|---|---|
| 2,670,164 | 2/1954 | Gill | 248/613 |
| 2,678,796 | 5/1954 | Roy | 248/613 |
| 3,268,082 | 8/1966 | Galin | 248/613 X |
| 4,238,102 | 12/1980 | Salter | 248/613 X |
| 5,029,670 | 7/1991 | Whitmer | 182/3 X |

*Primary Examiner*—Alvin C. Chin-Shue

[57] ABSTRACT

A removable safety system for construction workers which is mounted on an I-beam to provide a cable hand hold to which a safety lanyard may be fastened. The system includes a cable tensioner and shock absorber assembly that is utilized to pretension the cable and absorb shock in the event a worker fastened thereto inadvertently falls.

10 Claims, 7 Drawing Sheets

SAFETY SYSTEM INCLUDING CABLE TENSIONER AND SHOCK ABSORBER

BACKGROUND OF THE INVENTION

This invention relates to a safety system which utilizes a cable tensioner and shock absorber that is of special use for erecting the steel frames of buildings and bridges and provides the worker with a safety lifeline cable to which a safety lanyard can be fastened.

The present invention utilizes the earlier inventions by the same inventor shown in U.S. Pat. Nos. 4,037,824 and 5,029,670 which are incorporated herein by reference.

In working in high places on job sites such as on steel beams during the construction and maintenance of buildings and bridges there is a danger that a worker can fall. If some safety measures are not provided, such falls are quite dangerous and can result in serious injury and even death. The inventor of the present invention has provided a safety measure as shown in his two earlier patents which set forth a system that uses a safety lifeline cable which can serve as both a hand hold as well as a point to which one end of a safety worker's lanyard can be fastened. Thus if the worker inadvertently falls the lanyard and cable will arrest the fall. When a fall was arrested in the previous system, a substantial shock on both the safety system and the worker occurred. Also, the safety cable should be tensioned to a predetermined amount in a convenient manner.

The present invention provides an improved safety system which includes the advantages of the previous safety line arrangement but adds a unique tensioner and shock absorber that permits ready tensioning of the safety lifeline cable to a predetermined amount and also provides a shock absorber in case a worker inadvertently falls to lessen both the shock on the system and the worker when the fall is arrested.

The invention utilizes a system for personal safety for a worker on a construction site that includes a safety lifeline cable supported at a suitable height by safety posts or stanchions with each of the terminal ends of the cable suitably attached to the beams at the construction site. The cable is attached to a special cable tensioner and shock absorber which keeps a tension on the cable of a predetermined amount and absorbs shock to the safety system and to the worker in the event the worker inadvertently falls from a beam. The worker is held to the safety cable by a safety lanyard attached between the worker and the lifeline cable. The safety system is designed that a 300 pound weight can fall six feet and the system would arrest the fall. With the system of the present invention, which includes the unique tensioner and shock absorber, a test of 600 pounds falling six feet has been passed satisfactorily.

The special cable tensioner and shock absorber includes an elongated housing which encloses a coil compression spring. Within the spring is an elastomeric shock absorbing member which in turn surrounds an elongated spring compression rod. The rod extends from one end of the compression spring where it is capped by a square washer that rests on one end of the spring through the compression spring and elastomeric shock absorber and out an opening in one of the end walls of the housing where it can be terminated in the cable system. The other end of the housing is also terminated in the cable system.

When the safety cable is initially installed it is tightened to a predetermined tension. This is brought about by the square metal washer on one end of the compression spring, which is affixed to an end of the compression rod, pushing against the compression spring with the other end of the compression spring being restrained by the end wall of the housing. As tension is applied to the cable and on an end of the compression rod, the square plate moves within the housing until the predetermined tension is achieved. The square plate is prevented from rotating by the shape of the plate against the side walls of the housing. The desired tension is indicated by the edge of the square plate, which is preferably painted in a contrasting color such as yellow, reaches an indicia on the housing that indicates the predetermined tension has been achieved.

In the event a worker accidentally falls, a tension force is placed on the safety cable that exceeds the predetermined tension and this further compresses the coil compression spring until the elastomeric shock absorber is also contacted. The shock absorber which is located within the coils of the spring begins to also compress and absorb the shock loading and as it is compressed it expands in diameter which contacts the inner diameter of the coil compression spring to enhance the shock absorbing resistance to the forces placed on the safety cable. It can be seen that the shock forces placed on the safety cable are first primarily absorbed by the coil compression spring and then the shock absorption is supplemented by the elastomeric shock absorber contained within the compression spring.

In addition to protecting a worker, the present invention also offers some protection to the safety system such as when an I-beam inadvertently falls on the safety lifeline cable.

BRIEF DESCRIPTION OF THE DRAWINGS

The invention will become more readily apparent on reading the following descriptions including the drawings.

DESCRIPTION OF THE PREFERRED EMBODIMENT

In this description, including the accompanying drawings, there is shown and described a preferred embodiment of the invention. Others skilled in the art will understand the invention and the principles thereof and will be able to modify the preferred embodiment and embody the invention in a variety of forms, each as may be suited for the conditions of a particular case.

Figure 1:
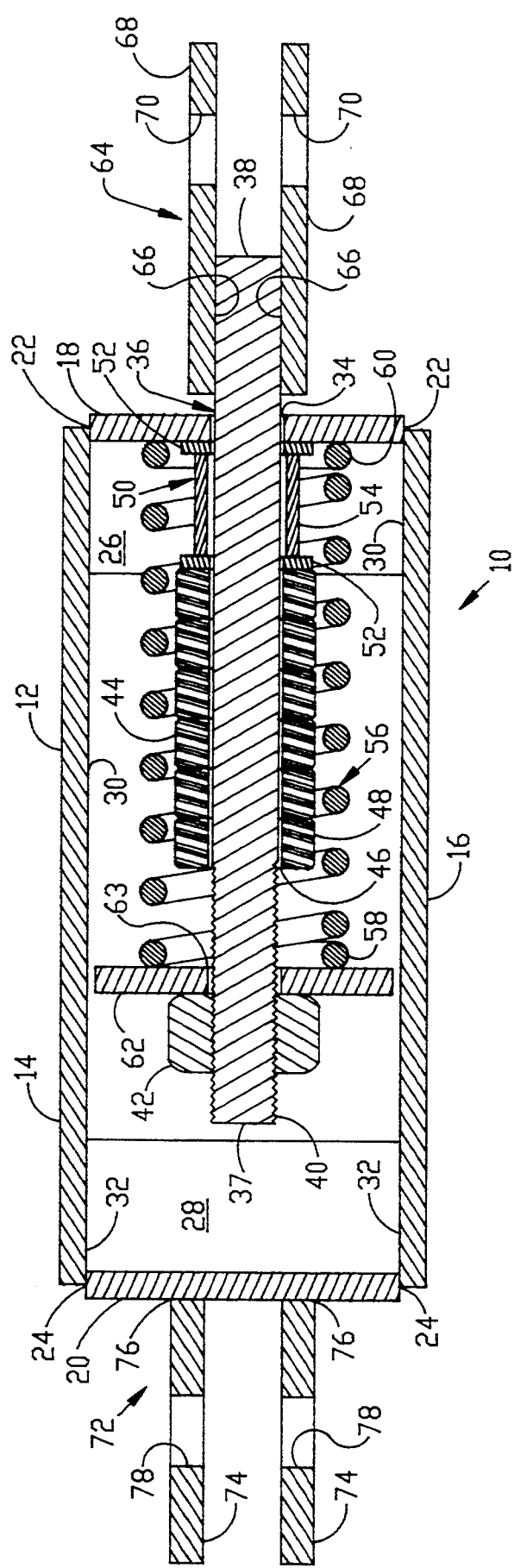
FIG. 1 is a longitudinal cross section of the cable tensioner and shock absorber of the present invention prior to tensioning the safety cable.

With reference to FIG. 1, there is shown a safety lifeline cable tensioner and shock absorber 10 having an elongated housing 12. The housing has two sides 14 and 16 each made of a flat steel plate 3 inches by 8 inches by ¼ inch thick. The housing also has a first end 18 and a second end 20 welded at 22 and 24 respectively to the housing sides. Each end is a short channel approximately 3 inches long having an end plate which actually forms the end and descending legs 26 and 28 which are likewise welded at 30 and 32 respectively to the housing sides. This defines an interior space in the housing approximately 3 inches by 3 inches square and approximately 7¾ inches long. Although not seen in FIG. 1, each end channel has two legs which partially enclose the open sides of the elongated housing 12 between the housing side 14 and 16.

The first end 18 has an aperture 34 to accommodate the movement of an elongated steel rod 36 which is ⅜ inch in diameter. The rod has a first end 37 and a second end 38. The first end 37 extends along with part of said rod into said housing through the opening or aperture 34 and is terminated in a threaded portion 40 onto which is threaded a nut 42. The second end 38 and the adjacent portion of said rod extends through said opening or aperture 34 external of said housing 12. Surrounding said rod within the housing are approximately 4 to 6 neoprene washers 44 forming a stack approximately 2⅛ inches tall and an outside diameter 48 of approximately 1½ inches. Each washer has an opening or inside diameter 46 of approximately 13/16 inches to permit the rod to be threaded therethrough. The washers are supported off of the inside of first end 18 by means of a spacer 50. Each spacer is made of two flat washers 52 of approximately the same inside and outside diameter of the neoprene washers. Each washer is welded to the end of a one inch long section of ⅜ inch pipe 54. Surrounding the elongated rod 36 and stack of neoprene washers 44 and spacer 50 is a steel coil compression spring 56 having an outside diameter of approximately 2¼ inches, and an inside diameter of approximately 1 9/16 inches and a relaxed length of approximately 4 inches made of steel wire or rod having a diameter of approximately 5/16 inches. It is to be noted from FIG. 1 that the length of the coil spring is greater than the length of the stacked neoprene washers and spacer. The coil spring has an inboard end 58 and an outboard end 60.

Surmounting the inboard end 58 of the coil spring is a spring compression member 62 made of a ¼ inch steel plate slightly smaller than 3 inches square so that the plate can freely slide in a longitudinal direction in the square shaped interior of housing 12 but yet be restrained from rotation by the housing. The member 62 has an aperture 63 through which elongated rod 36 is positioned. The relationship between the coil spring, stack of neoprene washers and spacer is such that the coil spring can be preferably compressed prior to the neoprene washers being compressed so that the elongated rod 36 can be pretensioned to a predetermined degree. When a worker falls the system acts as a shock absorber by the coil compression spring first compressing to resist the shock and then the stack of neoprene washers or wafers are contacted by compression member 62 which begins to compress them to further reduce the shock and help absorb any rebound. It has been found that the stack of washers is best located as shown in FIG. 1 by being offset by a spacer so that the neoprene washers do not start to absorb the shock loading at the first shock but rapidly come into play as the shock loading increases. Alternatively, the stack of neoprene washers could be increased to accommodate the height of the spacer but it has been found in practice it is best to utilize the height of the incompressible spacer as part of the height.

While neoprene is found to be satisfactory for the conditions under which the cable tensioner and shock absorber 10 are utilized, other similar elastomeric materials either in the form of a stack of washers or a solid molded elastomeric piece can also be utilized as would be obvious to one skilled in the art.

As shown in FIG. 1, the diameter of the spacer and the diameter of the compression spring are both larger than the opening 34 so the inside wall of the first end 18 of the housing serves to support one end of the shock absorbing and tensioning arrangement afforded by the coil spring and elastomeric shock absorbers.

A first attachment member 64 for attaching said tensioner and shock absorber assembly 10 into a safety cable system is welded at 66 to opposite sides of the second end 38 of rod 36. The attachment member 64 consists of two ¼ inch thick steel flat plates 68 1½ inch wide by 3½ inch long each of which has near its outer end an aperture or opening 70 to accommodate a through bolt. As is seen from FIG. 1, the ends of the flat plate 68 adjacent to the exterior side of first end 18 are larger than the aperture 34 and would prevent the rod 36 from being withdrawn into the housing further than the point to which the flat plates 68 are attached to the rod. As shown in FIG. 1, the coil spring is in a relaxed state and the rod is slightly loose and protruding.

The second attachment member 72 consisting of two ⅜ inch thick steel plates 2½ inch long by 2 inch wide steel plates spaced ¾ inch apart are welded at 76 to the outer end of the second end 20. Near the outer end of the two steel plates 74 are located openings or apertures 78 for the accommodation of a through bolt.

Figure 2:
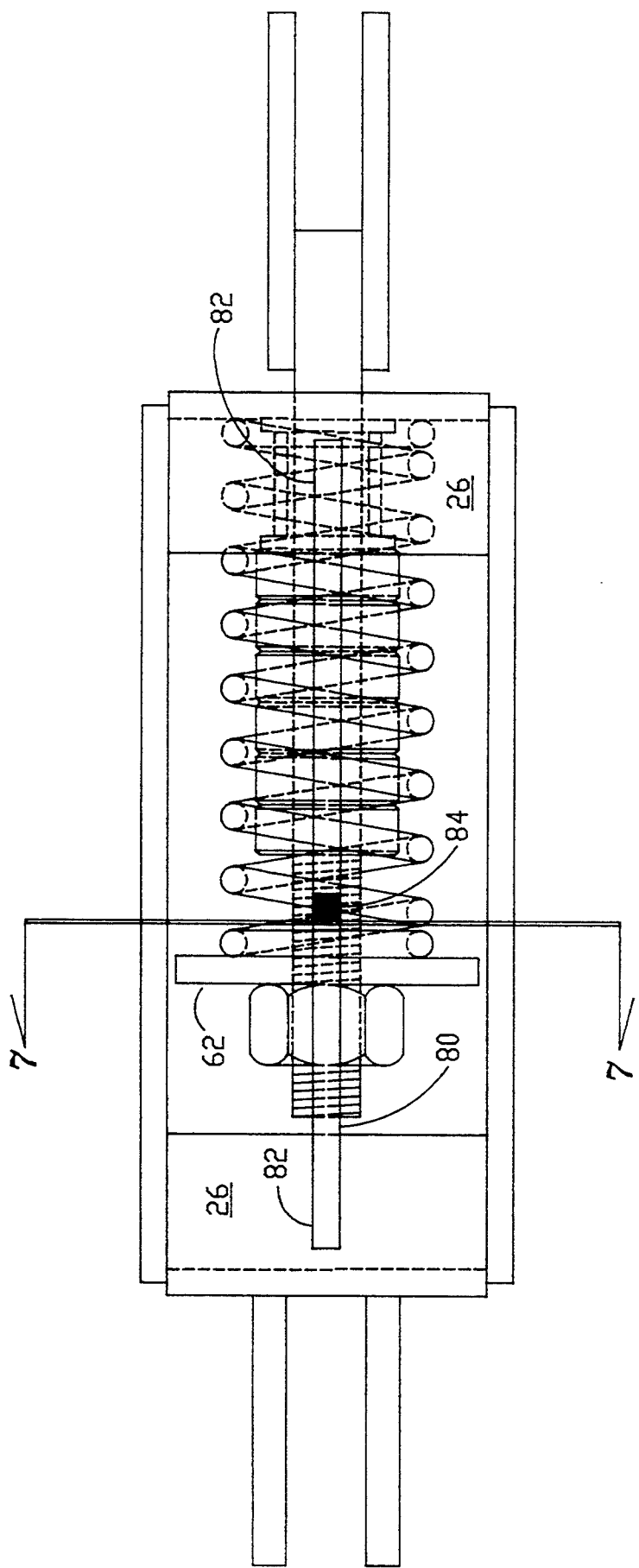
FIG. 2 is a side view similar to FIG. 1.

With reference to FIG. 2, which is an external view of the cross sectional view of FIG. 1, there is shown two containment and indicia rods 80 which were omitted from the view of FIG. 1. Only one of the rods can be seen in FIG. 2 since the second rod is on the opposite side of the housing and its view is concealed by the first rod. Each end of the containment and indicia rods 80 are welded at 82 to the adjacent channel leg 26. The rods serve to partially cage the open side of the housing and also furnish an indicia 84 for showing the predetermined tension point to which the cable assembly should be adjusted. In the preferred embodiment, the cable tensioner and shock absorber assembly 10 are painted red except for the spring compression member 62 and the indicia 84. The compression member and indicia are painted in a contrasting color which preferably is yellow.

Figure 3:
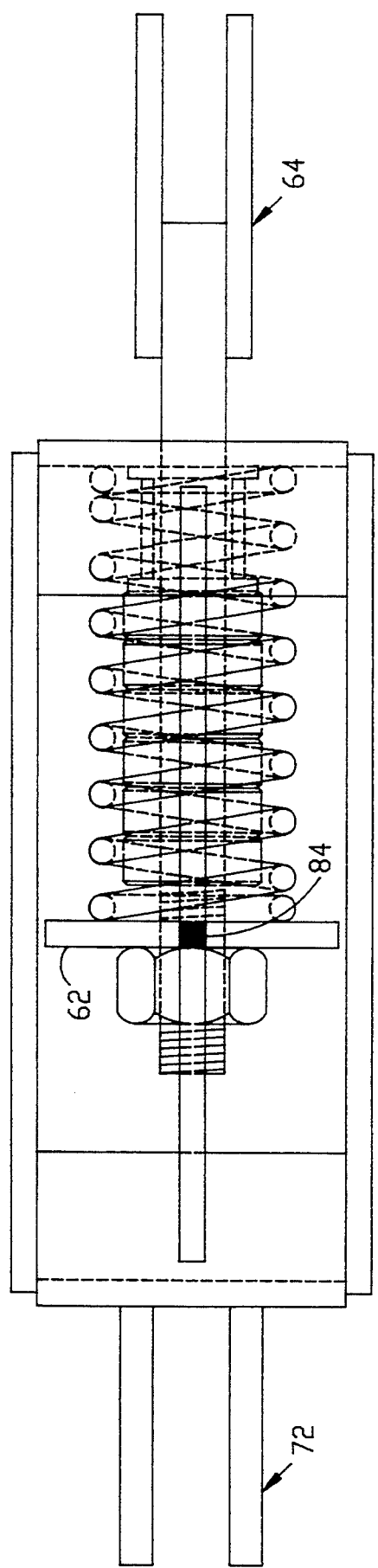
FIG. 3 is a view similar to FIG. 2 where the coil spring has moved to position that a predetermined tension has been placed on the safety cable.

With reference to FIG. 3, the cable tensioner and shock absorber is shown with the compression spring compressed to the point of predetermined tension to be placed on the safety lifeline cable which is by way of example approximately 200 pounds. This is shown by the indicia 84 lining up with the spring compression member 62. The pretensioning is brought about by external tension being placed between the first attachment member 64 and second attachment member 72 which pulls the elongated rod 36 to the right. This causes the compression spring 56 to begin to compress.

Figure 4:
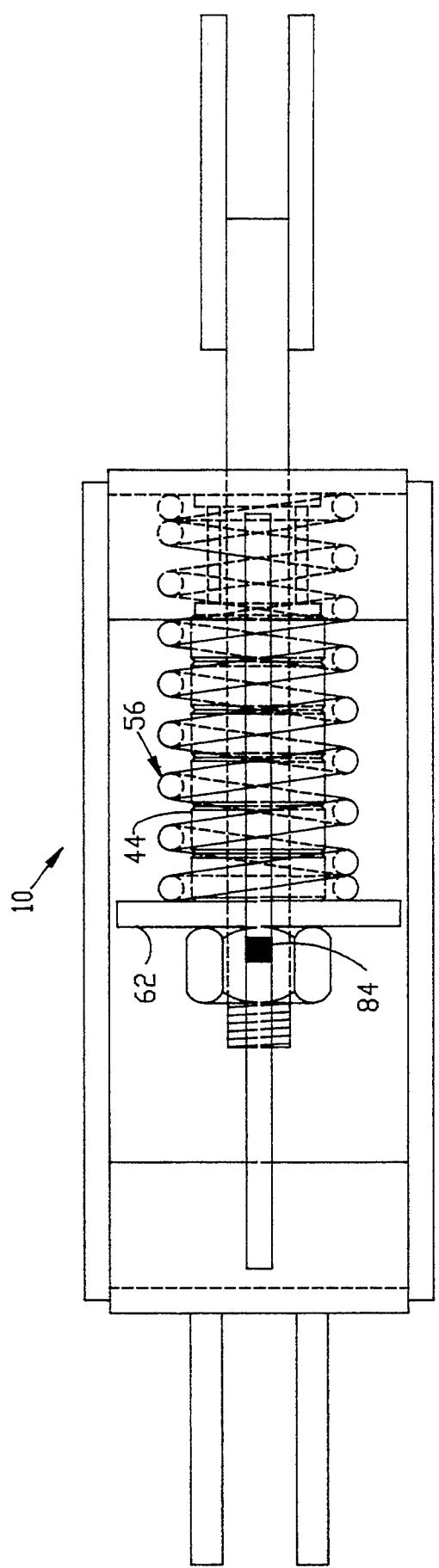
FIG. 4 is a view similar to FIG. 3 showing the position of the coil spring when a shock load has been placed thereon such as when a worker falls inadvertently.

FIG. 4 is similar to FIG. 3 except the tensioner and shock absorber 10 have been placed under tension loads such as would be encountered with light shock loading such as if a light weight worker fell and a safety lifeline cable arrested his or her fall. The spring compression member 62 has continued to compress the compression spring 56 which partially absorbs the shock loading with the remaining part of the shock loading being absorbed by the stack of neoprene washers 44 which are likewise being compressed. As seen in FIG. 4, the compression member 62 has moved well past the indicia 84. If a heavier shock loading is encountered, the compression spring 56 and elastomeric member 44 will continue to compress until all the coils of the spring contact one another. Since the elastomeric member 44 has an outside diameter approximately the same as the inside diameter of the spring, it expands into contact with the spring creating additional resistance which is believed to be helpful in absorbing the shock loading. The elastomeric member is made of solid neoprene or similar materials and is therefore incompressible although it is free to change and return to shape which is a characteristic of elastomeric and rubber-like materials.

Figure 5:
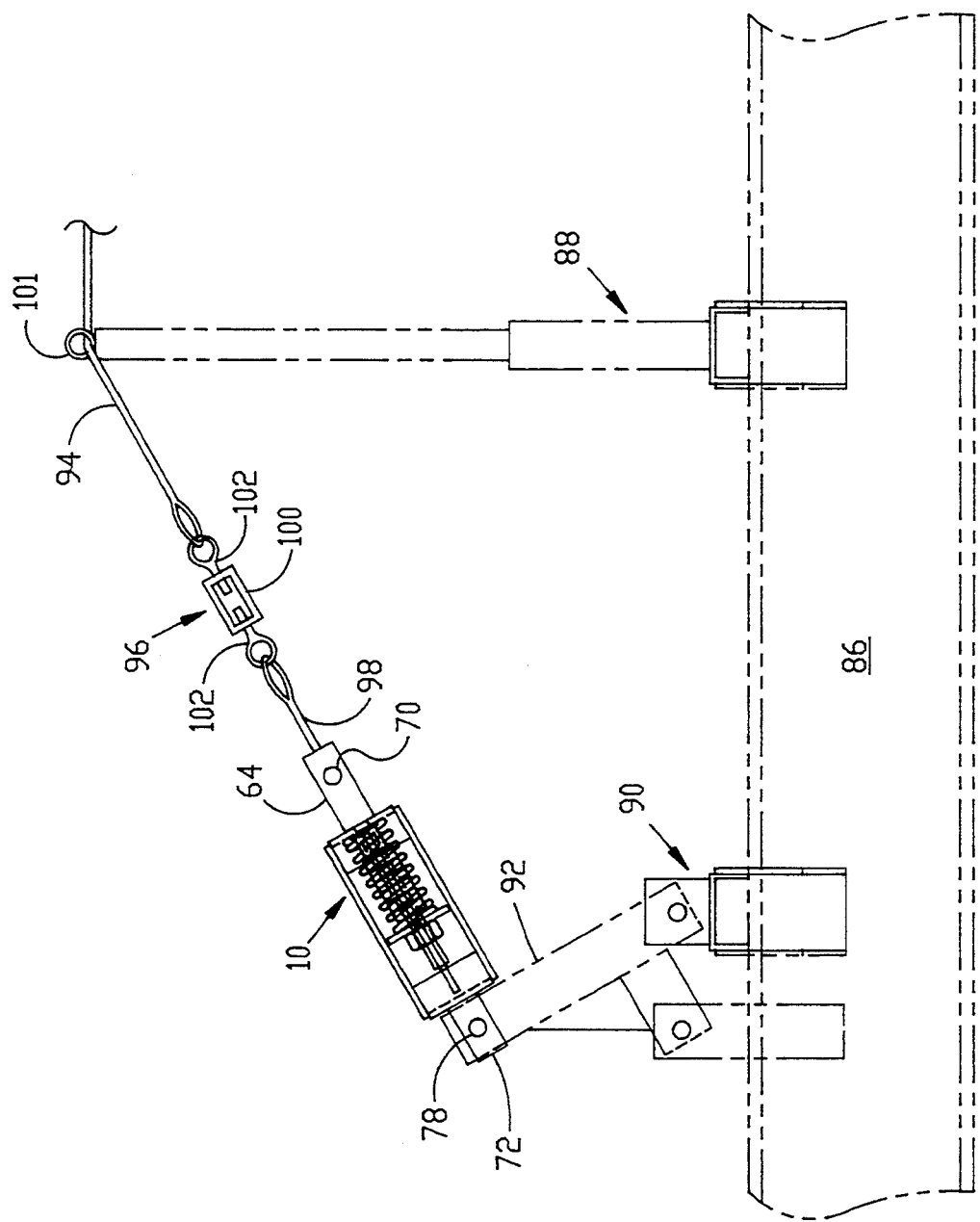
FIG. 5 shows a left end of the life line safety system installed on an I-beam showing one of the stanchions or safety posts, a termination member and the cable tensioner and shock absorber in position.

With reference to FIG. 5, there is shown a portion of a typical installation using the present invention. In this case the construction beam is an I beam 86 to which is attached a stanchion support clamping assembly 88 and a termination clamping assembly 90. The termination clamping assembly is a moving or sliding force multiplier assembly and it, along with the stanchion support clamping assembly, are fully shown in the inventor's prior U.S. Pat. No. 5,029,670. Both assemblies help to form a part of a safety cable system.

The cable tensioner and shock absorber assembly 10 may be attached in any suitable place in the safety cable system but preferably the second attachment member 72 is through bolted through openings 78 to the opening in the top of the pivoting upright lever or link 92. The through bolt is not shown in the figure for purposes of clarity. The safety lifeline cable 94 is attached to the first attachment member 64 through a turn buckle assembly 96 and a short piece of safety lifeline cable 98. One end of the cable 98 is fastened to a through bolt (not shown) passing through openings 70. The ends of the safety lifeline cable 94 and short piece of safety lifeline cable 98 are shown as loops in schematic fashion but normally they are fastened by passing the cable through a ring or around a bolt and doubling it back and fastening on itself with suitable hardware well known in the trade.

The turn buckle assembly 96 is a standard turn buckle having a turn buckle body 100 which each of the ends being threaded to receive two eye bolts 102. Each of the eye bolts contain a ring or eye and a threaded portion which is received into the turn buckle body. As well known, one of the threaded arrangements is a right hand thread and the other a left hand thread so that as the turn buckle body is rotated while the two eye bolts are maintained from rotating the two eye bolts are either drawn closer together or are permitted to separate further apart.

When the safety cable system is assembled on the I-beam as shown in FIG. 5 the safety lifeline cable 94 is passed through a ring 101 at the top of the stanchion support clamping assembly 88. The ring is shown schematically in the figure but is in the form of a pair of arcuate horns which overlap to form a ring shape as shown in U.S. Pat. No. 5,029,670. Once assembled, the turn buckle body 100 is rotated to draw tension on the system which causes the coil compression spring 56 to compress placing a pretension on the safety lifeline cable. The turn buckle is rotated until this tension is of a desired level which normally is approximately 200 lbs. of tension.

An alternative arrangement to that shown in FIG. 5 is to have one of the eye bolts 102 that is to be attached to the cable and shock absorber assembly 10 to be replaced with a threaded rod that is used in place of the elongated rod 36 and first attachment member 64. The rod would in effect be an integral first attachment member and elongated rod. It would extend directly through opening 34 of first end 18 all the way through to spring compression member 62 and either be attached in non-rotation fashion thereto or else extend through opening 63 in spring compression member 62. If it does extend through the opening 63 it still must be prevented from rotating relative to compression member 62. This is preferable accomplished by welding the nut 42 to the compression member 62 and placing a pin through the nut and end of the rod. Also a nut that is larger than the opening 34 would be placed on the elongated rod just outside of the first end 18. This nut would be pinned by a through pin between the nut and elongated rod and would act as a stop to prevent the rod from being drawn too deeply into the elongated housing 12.

If the turn buckle is not integrated with the cable tension and shock absorber assembly 10 in a manner similar to that just mentioned, it is not necessary that the first end of the elongated rod be precluded from rotations with respect to the compression member 62. As shown in FIG. 1, such rotation is not forbidden. However, it is important that the nut 42 be affixed to the threaded portion 40 of the elongated rod in a manner that it will not readily rotate off the rod. This can be accomplished either by a through pin or preferably by a standard nut of the self-locking type.

Figure 6:
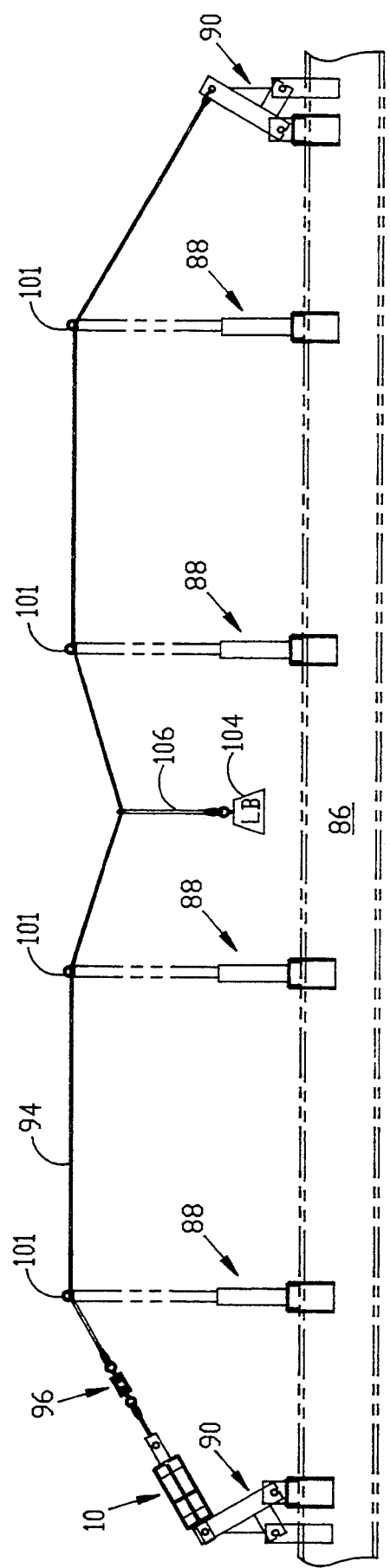
FIG. 6 is a side view showing a cable safety system, the safety cable supported by a number of stanchions and terminated by termination members clamped to an I-beam with the cable tensioner and shock absorber in position.

With reference FIG. 6, there is shown a complete safety cable system in a typical installation. The safety lifeline cable 94 is passed through the rings 101 at the top of 4 stanchion support clamping assemblies 88 which are clamped to the I-beam 86. Each end of the safety lifeline cable 94 and its system are terminated at a termination clamping assembly 90. Located in the system is the tensioner and shock absorber assembly 10 including turn buckle assembly 96 for pretensioning the life line and absorbing shocks in case a worker has an accidental fall or a piece of construction material falls against the life line.

Depicted in FIG. 6 is a weight 104 representing a worker fastened to the support life line cable by a lanyard 106. Although a short lanyard is shown in FIG. 6, it would normally be in the order of 6 feet long. The system should withstand the free fall of a 300 lb. weight attached to a 6' lanyard. The system shown readily does this and in fact has been tested with a 600 lb. weight falling 6' and passed in a satisfactory manner.

Figure 7:
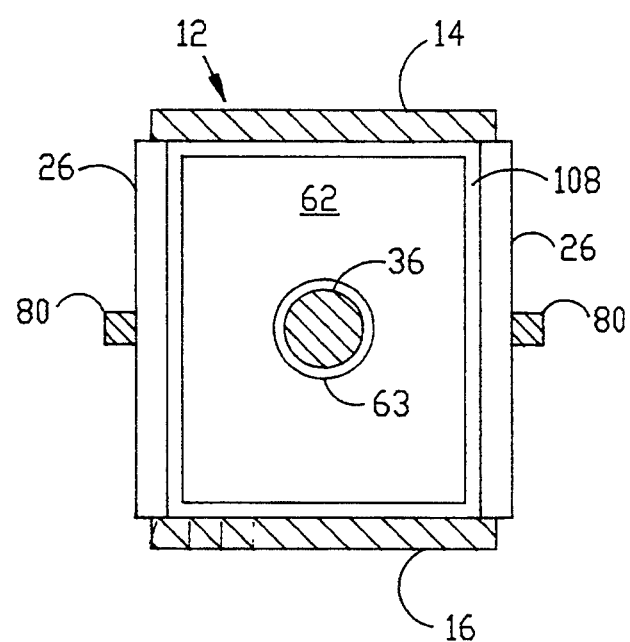
FIG. 7 is a transverse cross sectional view of the cable tensioner and shock absorber taken on Section 7—7 of FIG. 2 with the coil spring omitted.

With reference to FIG. 7, there is shown a cross sectional view taken on section 7—7 of FIG. 2 with coil spring 56 omitted for purposes of clarity. FIG. 7 shows spring compression member 62 with opening or aperture 63 contained in an elongated housing 12. There is sufficient clearance 108 on the four sides of member 62 to permit it to move in a longitudinal direction within the housing but the square shape within the housing prevents it from being rotated in any substantial amount relative thereto. Also shown in FIG. 7 are housing sides 14 and 16, channel legs 26 and the two containment and indicia rods 80. A cross section of elongated rod 36 is shown passing through opening 63.

It will apparent from the foregoing description, the accompanying drawings and the appended claims that various modifications in the illustrative embodiment may be made within the scope and spirit of the invention.

What is claimed is:

1. A safety life line cable tensioner and shock absorber assembly for attaching to a safety life line cable system used with a construction beam such as an I-beam comprising:

an elongated housing having a first and second end with said first end having an opening therein;

an elongated rod having a first end and a portion of said rod extending into said housing through said opening at one end of said housing and having a second end and a portion of said rod extending external of said housing;

an open coil compression spring having an inboard end and an outboard end located in said housing and surrounding at least part of said portion of said rod which extends into said housing;

a spring compression member affixed near said first end of said elongated rod for pushing said inboard end of said compression spring;

a first attachment member located at said second and external end of said rod for attaching said tensioner and shock absorber assembly into a safety cable system;

a second attachment member located at said second end of said housing for attaching said tensioner and shock absorber assembly into a safety cable system; and an elastomeric shock absorbing member located entirely inside said compression spring and has an outside diameter of substantially the same as the inside diameter of said compression spring whereby said tensioner and shock absorber may be used in a safety system to place a lifeline cable under a desired normal tension and absorb shock loading when a worker's fall is restrained by a lifeline with said elastomeric shock absorbing member expanding in diameter and engaging the inside diameter of said compression spring.

2. The cable tensioner and shock absorber assembly of claim 1 wherein:

an opening is provided in the side of said of elongated housing through which the said spring compression member is visible and indicia is provided at said opening to indicate when said spring compression member has moved to a point that a predetermined tension has been placed on a life line in the safety lifeline cable system.

3. The cable tensioner and shock absorber assembly of claim 1 wherein:

said elongated housing includes two housing sides located opposite from one another and two containment and indicia rods run in a longitudinal direction opposite to one another between said two housing sides with an indicia placed on said containment and indicia rods whereby said spring compression member is visible and indicate when a predetermined tension has been placed on said compression spring by said compression member being aligned with said indicia.

4. The cable tensioner and shock absorber assembly of claim 1 wherein:

said elastomeric shock absorbing member consists of a stack of solid elastomeric washers each having an outside diameter substantially the same as the inside diameter of said compression spring.

5. The cable tensioner and shock absorber assembly of claim 4 wherein:

the height of said stacked elastomeric washers is shorter than the relaxed height of said coil compression spring.

6. The cable tensioner and shock absorber assembly of claim 4 wherein:

said stacked elastomeric washers rest on a rigid spacer.

7. The cable tensioner and shock absorber assembly of claim 6 wherein:

the combined height of said stacked elastomeric washers and said spacer is shorter than the relaxed height of said coil spring.

8. A safety system providing safety to construction workers comprising:

at least two stanchion support assemblies for removeably clamping to the flange of a construction beam;

a safety line cable system running between said stanchion support assemblies having a first terminal end and a second terminal end;

two safety cable termination assemblies for attaching said first terminal end and said second terminal end to the flange of a construction beam by removeably clamping said termination assemblies thereto;

a safety life line cable tensioner and shock absorber assembly attached to said safety line cable in said safety cable system;

said cable tensioner and shock absorber assembly including:

an elongated housing having a first and second end with said first end having an opening therein;

an elongated rod having a first end and a portion of said rod extending into said housing through said opening at one end of said housing and having a second end and a portion of said rod extending external of said housing;

an open coil compression spring having an inboard end and an outboard end located in said housing and surrounding at least part of said portion of said rod which extends into said housing;

a spring compression member affixed near said first end of said elongated rod for pushing said inboard end of said compression spring;

a first attachment member located at said second and external end of said rod for attaching said tensioner and shock absorber assembly into said safety line cable system;

a second attachment member located entirely at said second end of said housing for attaching said tensioner and shock absorber assembly into said safety line cable system; and an elastomeric shock absorbing member located inside said compression spring and has an outside diameter of substantially the same as the inside diameter of said compressions spring whereby said tensioner and shock absorber may be used in a safety system to place a lifeline cable under a desired normal tension and absorb shock loading when a worker's fall is restrained by a lifeline with said elastomeric shock absorbing member expanding in diameter and engaging the inside diameter of said compression spring.

9. The safety system of claim 8 which further includes:
a tension adjustment arrangement for pretensioning said safety line cable by placing a predetermined compression on said compression spring.

10. A method for providing a safety system for construction workers comprising the following steps:
providing a construction beam such as an I-Beam;
mounting at least two stanchion support assemblies by removeably clamping said stanchion support assemblies to said construction beam;
mounting safety cable termination assemblies by removeably clamping a said cable termination assemblies to said construction beam;
attaching to one of said safety cable termination assemblies a cable tensioner and shock absorber assembly which includes:
an elongated housing having a first and second end with said first end having an opening therein;
an elongated rod having a first end and a portion of said rod extending into said housing through said opening at one end of said housing and having a second end and a portion of said rod extending external of said housing;
an open coil compression spring having an inboard end and an outboard end located in said housing and surrounding at least part of said portion of said rod which extends into said housing;
a spring compression member affixed near said first end of said elongated rod for pushing said inboard end of said compression spring;
a first attachment member located at said second and external end of said rod for attaching said tensioner and shock absorber assembly to either said safety cable termination assembly or a safety cable;
a second attachment member located at said second end of said housing for attaching said tensioner and shock absorber assembly to either said safety cable termination assembly or a safety cable; and
an elastomeric shock absorbing member located entirely inside said compression spring and has an outside diameter of substantially the same as the inside diameter of said compression spring;
positioning a safety cable between said attachment at one safety cable termination assembly, the stanchion support assemblies one of said attachment members of said cable tensioner and shock absorber assembly;
and applying tension to the safety cable until the spring compression member is compressed sufficiently to pretension the safety cable to a predetermined desired amount, whereby said elastomeric shock absorbing member expands in diameter, when absorbing shock loading, to engage the inside diameter of said compression spring.

* * * * *